E. D. KEMPER.
ANIMAL POKE.
APPLICATION FILED DEC. 12, 1914.
1,136,014.
Patented Apr. 20, 1915.
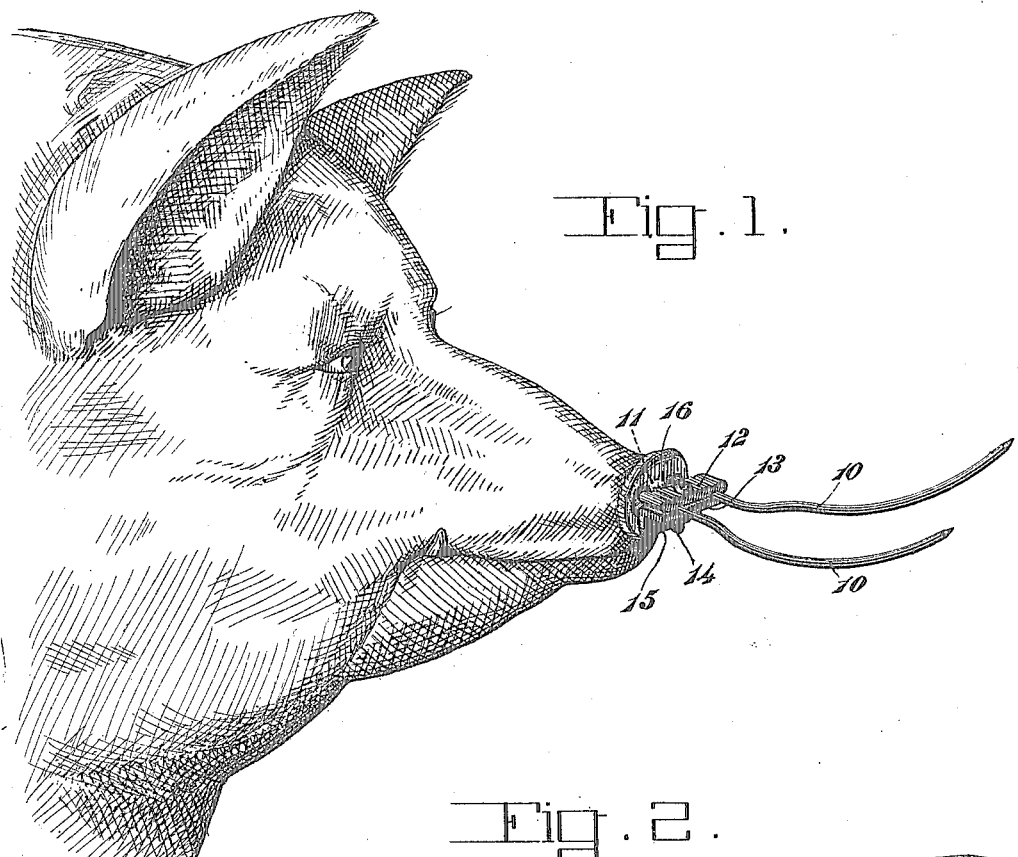
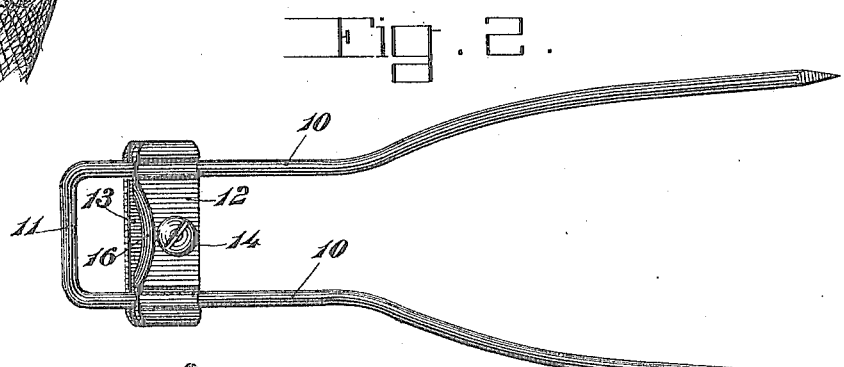
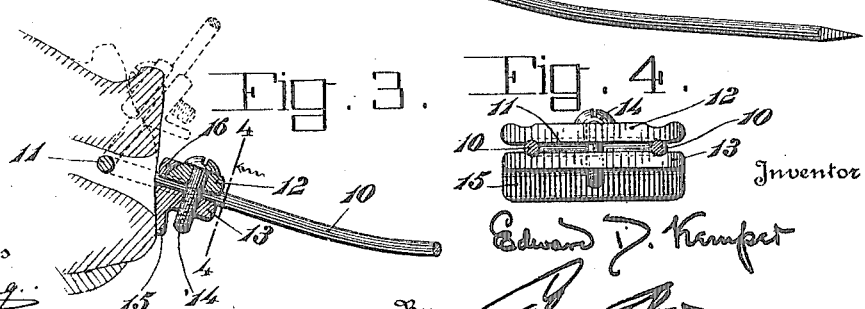

UNITED STATES PATENT OFFICE.

EDWARD D. KEMPER, OF STANTON, NEBRASKA.

ANIMAL-POKE.

1,136,014.  Specification of Letters Patent.  Patented Apr. 20, 1915.

Application filed December 12, 1914. Serial No. 876,873.

*To all whom it may concern:*

Be it known that I, EDWARD D. KEMPER, a citizen of the United States, residing at Stanton, in the county of Stanton and State of Nebraska, have invented or discovered certain new and useful Improvements in Animal-Pokes, of which the following is a specification, reference being had therein to the accompanying drawings.

This invention relates to devices adapted for attachment to the noses of animals for training, restraining, and protective purposes, and is more particularly directed to devices for preventing hogs from catching and devouring live poultry, although adapted for other and analogous uses in connection with the same and other animals.

The invention has for its general objects to provide a device of this character which may be securely retained in position and which will effectually perform its intended function without subjecting the animal to undue discomfort when in use, and without interfering with the animal's feeding or other proper and normal actions.

The foregoing and other more particular objects of the invention, together with means whereby the same may be carried into effect, will best be understood from the following description of one form or embodiment of the invention illustrated in the accompanying drawings. It will be understood, however, that the particular construction described and shown has been chosen for illustrative purposes merely, and that the invention, as defined by the claims hereunto appended, may be otherwise practised without departing from the spirit and scope thereof.

In said drawings: Figure 1 is a perspective view showing the device in use. Fig. 2 is a plan view of the device on an enlarged scale. Fig. 3 is a sectional view illustrating the operation of the device. Fig. 4 is a section on line 4—4, Fig. 3.

The device is preferably, although not necessarily, composed of a continuous strip of material, such as a length of resilient wire, bent into substantially U-shaped form to provide a pair of substantially parallel arms or prongs 10 connected at their inner ends by an integral transverse member 11. The arms 10 are preferably curved upwardly at their outer or forward ends, as shown most clearly in Fig. 1, and may, if desired, be bent slightly so as to diverge from one another at said outer or forward ends, as most clearly shown in Fig. 2. The transverse member 10, which in the form of the invention shown is intended to pass through the cartilaginous partition between the animal's nostrils, is preferably straight, as shown in Fig. 2, and is of a length less than the maximum or combined interior width of the two nostrils of the animal. The parallel arms 10 extend forwardly from said transverse member 11 in a direction substantially perpendicular thereto. By reason of this construction, the transverse member 11 may be passed through the cartilaginous partition of the animal's nose at a point some distance back of the outer end thereof and the arms 10 will project forwardly through and from the animal's nostrils, and be held against any very considerable lateral movement in a position substantially in lateral alinement with the nose.

Secured to and connecting the arms or prongs 10 is a clamp comprising upper and lower members 12 and 13, respectively, which engage the arms or prongs 10, at opposite sides, and are connected by a bolt or screw 14. By loosening the screw or bolt 14 the clamp may be adjusted to any longitudinal position on the arms 10 in accordance with the requirements and may be securely fastened in adjusted position. The lower clamping member 13 is provided on its under side with a depending bib 15 adapted to engage and bear against the animal's nose or snout, thereby supporting or holding the device in the predetermined or normal elevated position shown in Figs. 1 and 3 with the arms 10 extending directly forwardly, or substantially in vertical alinement with said nose or snout. The upper clamp member 12 is cut away at its inner edge, as shown at 16, to permit the device to be swung upwardly from the position shown in full lines in Fig. 3 into the position shown in dotted lines in said figure.

In order to apply the device the screw or bolt 14 is loosened and the clamp members 12 and 13 removed. One of the prongs or arms 10 is then passed through the partition of the animal's nose, the outer sides of the nostrils being pushed back, and said arms or prongs being slightly bent or sprung out of their normal position with reference to the member 11, if necessary. Thereafter the device is turned into the position shown in Figs. 1 and 3, and the clamp 12, 13, replaced and tightened upon the arms 10 in a suitable position, in accordance with the requirements, to engage the outer end of the animal's nose. Said clamp, when in place, effectually prevents the removal of the device, serves to support the same in the desired vertical position, as above explained, and also coöperates with the rectangular inner end thereof in holding said device against lateral movement as above referred to.

In use, should the animal attempt to pursue a fowl through grass or bushes with head down, as is usually the case, the arms or prongs 10 will become entangled in said grass or bushes, thereby impeding the animal's progress, and also pulling upon his nose in such a way as to cause him to stop. Should he, however, succeed in approaching a fowl, even upon bare ground, by stealth or otherwise, the forwardly extending arms 11, by pushing the fowl away if necessary, will prevent him from coming sufficiently close to the fowl to grasp it with his teeth. Even should the hog succeed in trapping the fowl in a fence corner or elsewhere, the arms 10 will still prevent him from reaching the fowl with his mouth, while the struggles of the fowl will transmit, through the arms 10, a pull on the animal's nose causing him to raise his head or draw back, thereby permitting the fowl to make its escape. It will be seen, however, that the device will not interfere in any way with the normal feeding of the animal, inasmuch as the recessed upper clamp member 12 permits the device to be turned or swung upwardly a considerable distance from its normal position, as shown in dotted lines in Fig. 3, whenever the animal lowers his head to the ground or trough, in the latter case permitting him to insert his snout a considerable distance into the trough without serious interference between the device and the bottom or sides of said trough. The upwardly curved outer ends of the arms 10, particularly when taken in connection with the capacity of the device for upward swinging movement, enable the animal to move slowly over the ground in a forward direction and with head down, as in normal feeding, without material inconvenience.

Having thus described my invention I claim and desire to secure by Letters Patent;

1. A device of the character described comprising a member adapted to engage and be attached to the nose of an animal, a pair of arms or prongs extending forwardly from said member, and a clamp secured to and connecting said arms or prongs in advance of said member.

2. A device of the character described comprising a member adapted to engage and be attached to the nose of an animal, a pair of arms or prongs extending forwardly from said member, and a clamp secured to and connecting said arms or prongs in advance of said member, said clamp being adapted to engage the animal's nose and hold said device in a predetermined elevated position.

3. A device of the character described comprising a member adapted to engage and be attached to the nose of an animal, a pair of arms or prongs extending forwardly from said member, and a clamp secured to and connecting said arms or prongs in advance of said member, said clamp being provided with a depending bib adapted to engage the animal's nose and hold said device in a predetermined elevated position.

4. A device of the character described comprising a member adapted to engage and be attached to the nose of an animal, a pair of upwardly curved arms or prongs extending forwardly from said member, and a clamp secured to and connecting said arms or prongs in advance of said member and adapted to engage the animal's nose and hold said device in a predetermined elevated position.

5. A device of the character described comprising a member adapted to engage and be attached to the nose of an animal, a pair of arms or prongs extending forwardly from said member, and an adjustable clamp secured to and connecting said arms or prongs in advance of said member.

6. A device of the character described comprising a member adapted to engage and be attached to the nose of an animal, a pair of arms or prongs extending forwardly from said member, and a clamp secured to and connecting said arms or prongs in advance of said member, said clamp being adapted to engage the animal's nose but being cut away at the top to permit said device to be swung upwardly from normal position.

7. A device of the character described comprising a member adapted to engage and be attached to the nose of an animal, a pair of arms or prongs extending forwardly from said member, and a clamp secured to and connecting said arms or prongs in advance of said member, said clamp being provided with a depending bib adapted to engage the animal's nose and hold said device in a normal elevated position and being cut away at the top to permit said device to be swung upwardly from said normal position.

8. A device of the character described comprising a member adapted to engage and be attached to the nose of an animal, a pair of arms or prongs extending forwardly from said member, and a clamp secured to and connecting said arms or prongs in advance of said member, said clamp comprising two separable members adapted respectively to engage both of said arms at opposite sides and a bolt connecting said clamp members.

9. A device of the character described comprising a member adapted to engage and be attached to the nose of an animal, a pair of arms or prongs extending forwardly from said member, and a clamp secured to and connecting said arms or prongs in advance of said member, said clamp comprising two separable members adapted respectively to engage both of said arms at opposite sides and a bolt connecting said clamp members, the lower of said clamp members being provided with a depending bib adapted to engage the animal's nose and hold said device in a normal elevated position.

10. A device of the character described comprising a member adapted to engage and be attached to the nose of an animal, a pair of arms or prongs extending forwardly from said member, and a clamp secured to and connecting said arms or prongs in advance of said member, said clamp comprising two separable members adapted respectively to engage both of said arms at opposite sides and a bolt connecting said clamp members, the upper of said clamp members being cut away to permit said device to be swung upwardly.

11. A device of the character described comprising a member adapted to engage and be attached to the nose of an animal, a pair of arms or prongs extending forwardly from said member, and a clamp secured to and connecting said arms or prongs in advance of said member, said clamp comprising two separable members adapted respectively to engage both of said arms at opposite sides and a bolt connecting said clamp members, the lower of said clamp members being provided with a depending bib adapted to engage the animal's nose and hold said device in a normal elevated position, and the upper of said clamp members being cut away to permit said device to be swung upwardly from said normal position.

12. A device of the character described comprising a transverse member adapted to pass through the nose of an animal, a pair of substantially parallel arms or prongs extending forwardly from said transverse member, and a clamp secured to and connecting said arms or prongs in advance of said transverse member.

13. A device of the character described comprising a substantially straight transverse member adapted to pass through the nose of an animal and of a length less than the maximum interior width of the nostrils of said animal, a pair of substantially parallel arms or prongs extending forwardly from said transverse member, and a clamp secured to and connecting said arms or prongs in advance of said transverse member.

14. A device of the character described comprising a continuous strip of material bent into substantially U-shaped form to provide a pair of substantially parallel arms or prongs and a transverse member connecting said arms or prongs, and a clamp secured to and connecting said arms or prongs in advance of said transverse member.

In testimony whereof I affix my signature, in presence of two witnesses.

EDWARD D. KEMPER.

Witnesses:
FRED H. KEMPER,
R. O. BRANDT.

Copies of this patent may be obtained for five cents each, by addressing the "Commissioner of Patents, Washington, D. C."